(12) United States Patent
Taft et al.

(10) Patent No.: US 10,541,527 B2
(45) Date of Patent: Jan. 21, 2020

(54) INDUCTIVE ISOLATION OF CAPACTIVE LOAD IN AMPLITUDE LIMITERS

(71) Applicant: TEXAS INSTRUMENTS DEUTSCHLAND GmbH, Freising (DE)

(72) Inventors: Robert C. Taft, Munich (DE); Alexander Bodem, Rodgau (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 0 days.

(21) Appl. No.: 13/847,261

(22) Filed: Mar. 19, 2013

(65) Prior Publication Data

US 2014/0285931 A1    Sep. 25, 2014

(51) Int. Cl.
*H02H 3/20* (2006.01)
*H02H 9/04* (2006.01)

(52) U.S. Cl.
CPC .............. *H02H 3/20* (2013.01); *H02H 9/046* (2013.01)

(58) Field of Classification Search
CPC .. H02H 3/02; H02H 3/20; H02H 9/04; H02H 9/041; H02H 9/046; H01L 27/0251; H01L 27/0266
USPC .......................................................... 361/54
See application file for complete search history.

(56) References Cited

U.S. PATENT DOCUMENTS

| 4,750,061 | A | | 6/1988 | Kawasaki | |
|---|---|---|---|---|---|
| 5,946,177 | A | * | 8/1999 | Miller et al. | 361/56 |
| 8,188,682 | B2 | | 5/2012 | Nalbant | |
| 2002/0121924 | A1 | * | 9/2002 | Yue et al. | 327/310 |
| 2005/0122646 | A1 | | 6/2005 | Okushima | |
| 2005/0135026 | A1 | | 6/2005 | Khorram | |
| 2009/0261897 | A1 | * | 10/2009 | Bobde | 327/552 |
| 2010/0296212 | A1 | * | 11/2010 | Liang et al. | 361/56 |
| 2011/0043955 | A1 | | 2/2011 | Ippei Node | |
| 2014/0198414 | A1 | * | 7/2014 | Worley et al. | 361/56 |

FOREIGN PATENT DOCUMENTS

| CN | 101877481 A | 11/2010 |
|---|---|---|
| CN | 101997311 A | 3/2011 |
| JP | 2005167049 A | 6/2005 |
| JP | 2011045157 A | 3/2011 |
| SU | 374701 | 9/1971 |

OTHER PUBLICATIONS

Jianguo Hu; Low-Power Energy Supply Circuit for Passive RFID Transponder; 2009 IEEE International Conference on RFID; p. 1-6 (6pgs).
PRC Search Report for Chinese Application No. 2014800171450.
Search Report for Application No. EP 14767569.8-PCT/US2014031206, dated Mar. 3, 2017.
References cited Apr. 17, 2019.

* cited by examiner

*Primary Examiner* — Kevin J Comber
(74) *Attorney, Agent, or Firm* — John R. Pessetto; Charles A. Brill; Frank D. Cimino

(57) ABSTRACT

An amplitude limiter circuit includes an inductor and a shunt circuit. The inductor has a first terminal connected to an input node. The shunt circuit is connected to a second terminal of the inductor and also is connected to a low impedance node. If an overvoltage condition forms on the input node, the shunt circuit forms an overvoltage current path from the input node, through the inductor, through the shunt circuit and to low impedance node.

13 Claims, 3 Drawing Sheets

INDUCTIVE ISOLATION OF CAPACTIVE LOAD IN AMPLITUDE LIMITERS

CROSS-REFERENCE TO RELATED APPLICATION

N/A.

BACKGROUND

Many circuits may be damaged by overvoltage conditions on an input signal to the circuit. Thus, overvoltage circuitry may be included to protect against such overvoltage conditions. Some overvoltage protection circuitry includes the use of various transistors that switch on upon detection of an overvoltage condition on an input node. The amount of current such transistors may be required to sink may necessitate the transistors to be relatively large. A large transistor results in large parasitic capacitances caused by the transistor. Large parasitic capacitances may limit the bandwidth of the circuitry, which is a particular problem for high speed data signals.

SUMMARY

Some implementations are directed to an amplitude limiter circuit that includes an inductor and first and second transistors. The inductor has a first terminal connected to an input node. The first transistor is connected to a second terminal of the inductor and also is connected to ground. The second transistor is connected to the input node and to a gate of the first transistor. If an overvoltage condition forms on the input node, the second transistor is caused to conduct thereby turning on the first transistor which, in turn, causes an overvoltage current path to form from the input node, through the inductor, through the first transistor and to ground. The inductor of the amplitude limiter isolates the input signal from any parasitic capacitance that may be caused by the first transistor.

Other implementations are directed to a host and an amplitude limiter to limit an amplitude of an input signal and provide the amplitude limited signal to the host. The amplitude limiter includes an inductor having a first terminal connected to an input node. The limiter also includes a first transistor connected to a second terminal of the inductor. The first transistor is also connected to ground. The second transistor is connected to the input node and to a gate of the first transistor. When an overvoltage condition on the input node is formed, the second transistor is caused to conduct thereby turning on the first transistor which, in turn, causes an overvoltage current path to form from the input node, through the inductor, through the first transistor and to ground.

BRIEF DESCRIPTION OF THE DRAWINGS

For a detailed description of various examples of the disclosure, reference will now be made to the accompanying drawings in which.

DETAILED DESCRIPTION

Various examples are shown and described herein. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary of that embodiment, and not intended to intimate that the scope of the disclosure, including the claims, is limited to that embodiment.

Figure 1:
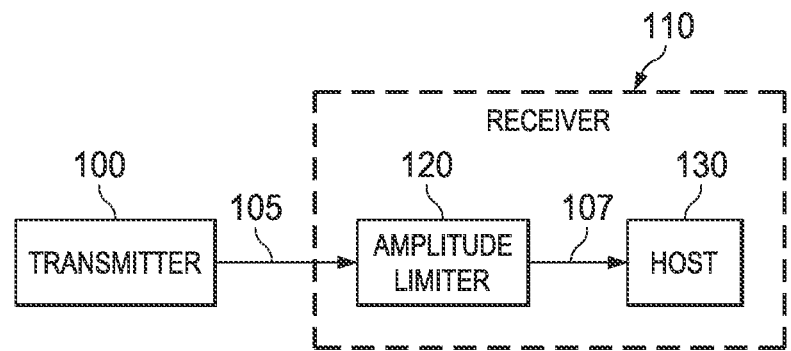
FIG. 1 shows a system in accordance with principles of the disclosure and including an amplitude limiter circuit.

The examples described herein are directed to an amplitude limiter that limits the amplitude of an input signal. FIG. 1 illustrates a system in which a transmitter 100 transmits a signal 105 to a receiver 110. The transmitter 100 and receiver 110 may be part of the same device or may be implemented in different devices. In some implementations, the transmitter 100 and receiver 110 may be embodied on a common silicon substrate, while such is not the case in other implementations.

As shown, the receiver 110 includes an amplitude limiter 120 coupled to a host 130. The host 130 provides the receiver with its intended functionality and no limitation is made herein as to the functionality implemented by the transmitter 100 and receiver 110, other than for the transmitter to provide a signal 105 to the receiver. The signal 105 may be a single-ended or a differential signal.

The amplitude limiter 120 receives the input signal 105 from the transmitter 100 and limits the amplitude of the input signal to a specified threshold. In some implementations, the amplitude limiter 120 limits the input signal to be less than, for example, 2V, although other overvoltage thresholds are possible as well. Any attempted deviation of the voltage amplitude of the input signal 105 outside the prescribed overvoltage threshold will be limited by the amplitude limiter 120 by forcing the voltage amplitude of the input signal 105 to be below the prescribed overvoltage threshold. The amplitude limiter 120 provides the amplitude limited input signal 105 to the host 130 as shown by signal 107.

Figure 2:
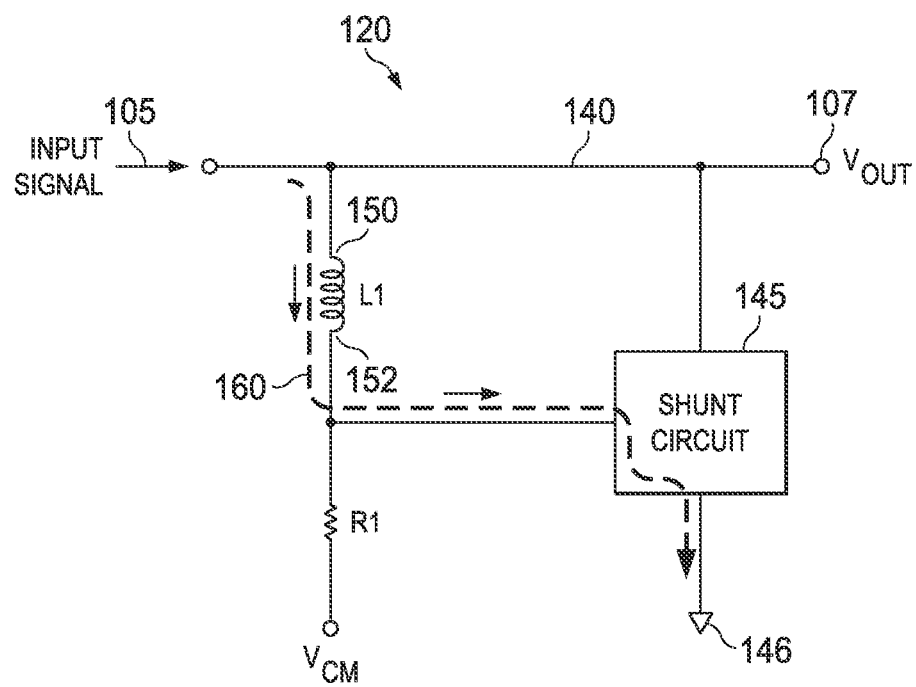
FIG. 2 shows an example of the amplitude limiter of FIG. 1.

FIG. 2 shows an example of the amplitude limiter 120. In some implementations, the amplitude limiter 120 limits the amplitude of a single-ended signal. The implementation of FIG. 2 pertains to a differential input signal 105 and FIG. 2 shows the amplitude limiter 120 that limits the amplitude of the positive differential input signal—a corresponding amplitude limiter 120 would also be provided to limit the amplitude of the negative differential input signal.

As shown, amplitude limiter 120 includes an inductor L1, a resistor R1, and a shunt circuit 145. The input signal 105 is provided at an input node 140, and the input node 140 also provides the output signal 107 to host 130. That is, the input node both receives the signal 105 from the transmitter to be amplitude limited and is the amplitude limited signal 107 itself. The inductor L1 includes a first terminal 150 connected to the input node 140. A second terminal 152 of the inductor L1 connects to impedance matching resistor R1 and to the shunt circuit 145. The shunt circuit 145 connects to a low impedance node 146 (e.g., ground). The shunt circuit 145 also connects to the input node 140 so as to monitor the voltage level of the input signal 105.

When the shunt circuit 145 detects that the voltage on the input node 140 is beginning to exceed an overvoltage threshold, the shunt circuit causes an overvoltage current path 160 to from input node 140 through inductor L1, through shunt circuit 145 and to the low impedance node 146. Otherwise, the absence of an overvoltage condition, the overvoltage current path 160 does not form and no current from the input node 140 is shunted through the shunt circuit 145. By shunting current from the input node 140 to the low impedance node 146 and as further described below, the voltage on the input node is precluded from exceeding the overvoltage threshold.

Any parasitic capacitance caused the shunt circuit 145 is essentially isolated by the inductor L1. An inductor's impedance increases with increasing impedance. Thus, at relative high impedance, the equivalent impedance of the series combination of the inductor L1 and the parasitic capacitance of the shunt circuit 145 is essentially dominated by the inductor L1. As such, the parasitic capacitance of the shunt circuit 145 has little effect on the bandwidth of the input signal 105.

Figure 3:
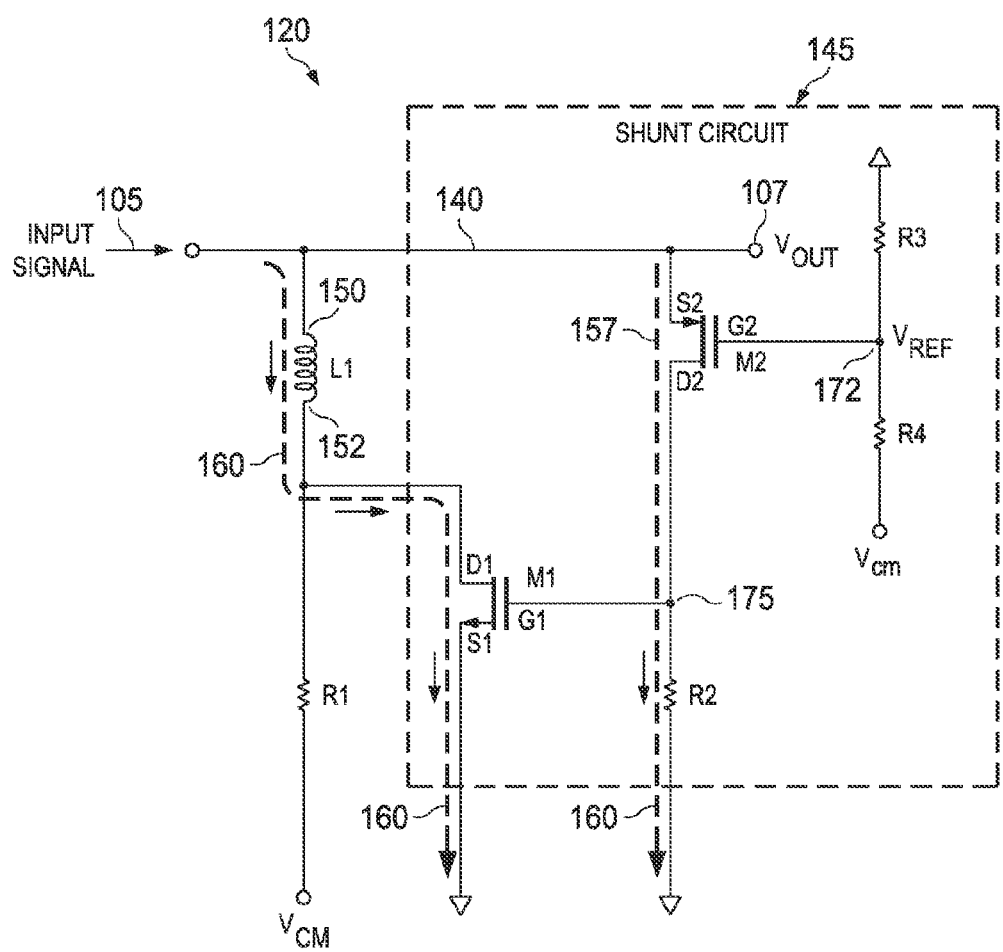
FIG. 3 shows a more detailed implementation of the amplitude limiter circuit of FIG. 2.

FIG. 3 shows an example circuit implementation of the amplitude limiter 120. Other circuit architectures are possible as well. The illustrative circuit in FIG. 3 includes the inductor L1, transistors M1 and M2, and resistors R1-R4. An example of the shunt circuit 145 of FIG. 2 is illustrated in FIG. 3 as comprising transistors M1 and M2 and resistors R2-R4. In the example of FIG. 3, transistor M1 is an N-channel metal oxide semiconductor (NMOS) transistor and transistor M2 is a P-channel MOS (PMOS) transistor, although other types of transistors and doping schemes can be implemented as well.

As explained above, the input signal 105 is provided at input node 140, and the input node 140 also provides the output signal 107 to host 130. That is, the input node both receives the signal 105 from the transmitter to be amplitude limited and is the amplitude limited signal 107 itself. The first terminal 150 of inductor L1 is connected to the input node 140. The second terminal 152 of the inductor L1 connects to the drain D1 of transistor M1. The source S1 of transistor M1 is connected to a low impedance node which in the example of FIG. 2 (and FIG. 3) is ground. The second terminal 152 of the inductor L1 also connects to a resistor R1 as shown. Resistor R1 is selected to function as an input termination resistor to match impedance with the transmitter 100 so as to better attenuate reflections that might otherwise occur if no termination resistor or an improperly selected termination resistance was used.

Resistors R3 and R4 form a voltage divider whose divided voltage on node 172 is provided to the gate G2 of transistor M2. The source S2 of transistor M2 connects to the input node 140. The drain D2 of transistor M2 connects to resistor R2 (which connects to ground) and also to the gate G1 of transistor M1. The connection point between the drain D2 of transistor M2, the gate G1 of transistor M1 and resistor R2 is labeled as node 175. In some implementations, the source S2 of transistor M2 may connect to the second terminal 152 of the inductor, rather than the input node 140.

The voltage on node 172 from the voltage divider formed by resistors R3 and R4 is a reference voltage (VREF) for determining the overvoltage point (i.e., the point at which the voltage amplitude of the input signal 105 exceeds a maximum rating for host 130) for the amplitude limiter 110. When the voltage on input node 140 relative to the reference voltage on node 172 provided to the gate G2 of transistor M2 exceeds the gate-to-source threshold voltage for transistor M2, the transistor M2 turns on. Otherwise, if the voltage on input node 140 relative to the voltage at node 172 is below transistor M2's threshold voltage, the transistor M2 remains off. During normal system operation in which the voltage on input node 140 is not in an overvoltage condition, transistor M2 is off. With transistor M2 off, the voltage on node 175 will be low thereby causing transistor M1 to be off as well. Thus, during normal system operation (no overvoltage condition), both transistors M1 and M2 are off and no current is conducted through either transistor.

However, as soon as the voltage on the input node 140 begins to increase above the overvoltage limit (per the threshold voltage of transistor M2), the voltage between the source S2 and the gate G2 of transistor M2 will be high enough so as to cause transistor M2 to turn on. With transistor M2 on, a current path 157 is formed from the input node 140 through transistor M2 and resistor R2 to ground. As a result, a non-zero voltage forms on node 175 that is large enough to turn on transistor M1. With transistor M1 turned on, an overvoltage current path 160 forms in FIG. 3. The overvoltage current path 160 forms from the input node 140 through inductor L1 and transistor M1 to ground. The voltage drops across the inductor L1 and transistor M1 combine as the voltage on input node 140. The input voltage on input node 140 thus is influenced by two factors. The first factor is the voltage on the input signal 105 generated by the transmitter 100. The second factor is the combined voltages of the inductor L1 and transistor M1. The combined voltages from the inductor L1 and transistor M1 dominate any competition caused by the transmitter, and the voltage on the input node 140 is thereby limited to the combined voltages of the inductor L1 and transistor M1. The component selection for the inductor L1 and transistor M1 are such that the resulting voltages combine to form the target overvoltage threshold.

In general, an inductor's impedance increases with frequency. The inductor L1 serves two purposes. First, the inductor L1 ensures superior bandwidth properties for the system than without the inductor. At higher frequencies, the impedance of the inductor, which is in series with resistor R1, increases. Resistor R1 is an input termination resistor, and, due to the frequency-dependent impedance of inductor L1, the effective input termination resistance increases with increasing frequency on the input signal 105.

Second, because the impedance of inductor L1 increases with frequency, the relatively high impedance of inductor L1 at high frequency (as compared to the parasitic capacitance from transistor M1) effectively isolates the input signal 105 from any parasitic capacitance caused by transistor M1. The series combination of the inductor L1 and the parasitic capacitance caused by transistor M1 has a relatively high impedance due to the impedance of the inductor L1. As such, during normal system operation (no overvoltage condition), parasitic capacitance from the amplitude limiter's transistor M1 (which is relatively large to sink current during an overvoltage condition) has much less of an impact on the bandwidth of the input signal 105 than might otherwise be the case if no inductor was used.

The voltage labeled $V_{CM}$ in FIG. 3 refers to a common mode voltage between positive and negative signals of a differential signal pair.

The example circuit of FIG. 3 includes only two transistors. However, in other examples, more than two transistors are possible.

Figure 4:
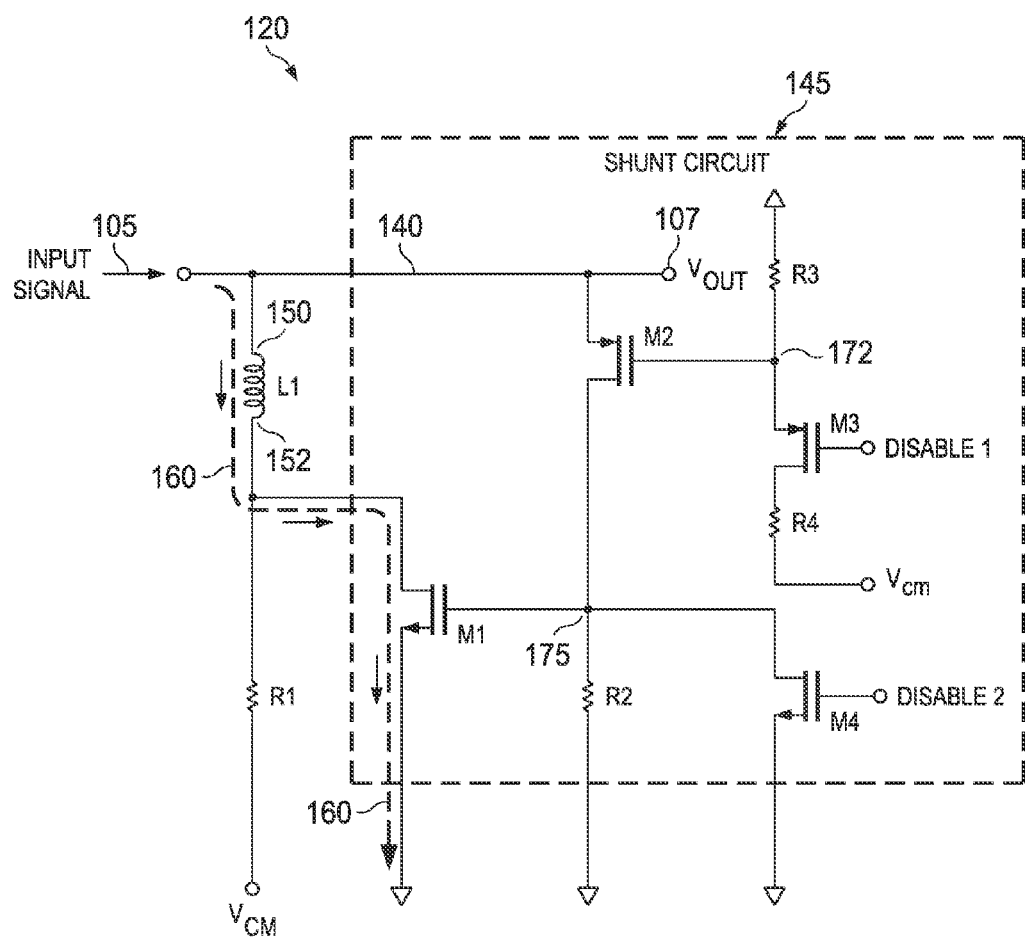
FIG. 4 shows a more detailed implementation of the amplitude limiter circuit of FIG. 2.

FIG. 4 shows another implementation of amplitude limiter 110. The implementation of FIG. 4 is similar in many respects to the implementation of FIG. 3. The principle difference is the inclusion of transistors M3 and M4. Transistor M3 preferably is a PMOS device and transistor M4 preferably is an NMOS device, although transistors M3 and M4 can be different in other implementations. The source and drain of transistor M3 are connected in series with voltage divider resistors R3 and R4. Transistor M4 connects to node 175 and ground as shown. Transistors M3 and M4 function to disable the overvoltage protection otherwise afforded by the amplitude limiter 110. Both transistors are controlled by the same control signal DISABLE, although separate disable signals may be used as well. The DISABLE signal may be controlled by host 130.

To activate the amplitude limiter 110, the DISABLE signal is forced to a logic low level. With DISABLE low, transistor M3 is on and transistor M4 is off. With M3 on, the voltage divider provides the divided down voltage on node 172 to the gate of transistor M2 as explained above. Transistor M4 being off due to a low state for the DISABLE signal precludes M4 from having any effect on the operation of the circuit.

To disable the amplitude limiting functionality of amplitude limiter 110, the DISABLE signal is forced to a logic high level (e.g., by host 130). With DISABLE high, transistor M3 is off and transistor M4 is on. With transistor M3 in an off state, no current flows from the positive supply voltage through resistor R3 and, as a result, the voltage on node 175 is forced high. By forcing the voltage on node 172 to a high level, transistor M2 will not turn on despite an overvoltage condition on input node 140. With transistor M4 in an on state (and with its source connected to ground), node 175 is forced low which also precludes transistor M1 from turning on. As such, the overvoltage current path 160 will not form even in the presence of an overvoltage condition on the input node 140.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A circuit including input overvoltage protection, comprising:
    circuitry to receive an input voltage signal at an input node;
    a shunt circuit including
        a sense node connected to the input node,
        a shunt node coupled to controllably receive an inductive current based on the input voltage signal received at the input node,
        a low impedance node;
    the shunt circuit to monitor the input voltage signal at the sense node, and in response to an overvoltage condition, to form an overvoltage current path for the inductive current, from the input node, through the shunt node and the shunt circuit, and to the low impedance node;
    the shunt circuit including
        a first transistor coupled between the shunt node and the low impedance node; and
        a control circuit, including:
            a second transistor connected between the sense node and the control terminal of the first transistor, and
            reference voltage circuitry connected to a control input of the second transistor to establish an overvoltage control point corresponding to the overvoltage condition,
            the second transistor responsive to the input voltage signal at the sense node, and the overvoltage control point to control the first transistor to form the overvoltage current path in response to the overvoltage condition.

2. The circuit of claim 1, wherein the shunt circuit further includes at least one transistor controllable to enable and disable the shunt circuit.

3. The circuit of claim 1, wherein the shunt circuit is operative to shunt the inductive current through an inductor external to the circuit, connected between the input node and the shunt node.

4. The circuit of claim 3, further comprising an input termination impedance matching resistor connected through the inductor to the input node.

5. The circuit of claim 1, further comprising an inductor connected between the input node and the shunt node.

6. The circuit of claim 5, further comprising an input termination impedance matching resistor connected through the inductor to the input node.

7. A shunt circuit suitable to provide input overvoltage protection for an input voltage signal received through an input node, comprising:
    a sense node connected to the input node,
    a shunt node coupled to controllably receive an inductive current based on the input voltage signal received at the input node,
    a low impedance node;
    a first transistor, including
        a first terminal connected to the shunt node,
        a second terminal connected to the low impedance node, and
        a control terminal; and
    control circuitry, including
        a second transistor connected between the sense node and the control terminal of the first transistor; and
        reference voltage circuitry connected to a control input of the second transistor to establish an overvoltage control point corresponding to an overvoltage condition;
        the control circuitry to monitor the input voltage signal at the sense node, and in response to the overvoltage condition, to control the first transistor to form an overvoltage current path for the inductive current from the input node through the shunt node and the first transistor, and to the low impedance node.

8. The shunt circuit of claim 7 further comprising third and fourth transistors connected respectively to the control terminal of the first transistor, and a control terminal of the second transistor, and controllable to disable the shunt circuit.

9. The shunt circuit of claim 7, wherein the shunt node is coupled through an inductor to the input node.

10. The shunt circuit of claim 9, further comprising an input termination impedance matching resistor connected through the inductor to the input node.

11. A system, comprising:
    a circuit configured to receive an input voltage signal at an input node;
    a shunt circuit to monitor the input voltage signal, and detect an overvoltage condition;
    the shunt circuit including
        a sense node connected to the input node,
        a shunt node,
        a low impedance node; and
    an inductor connected between the input node and the shunt node;

the shunt circuit including
   a first transistor connected between the shunt node and the low impedance node, and
   a control circuit, including:
a second transistor connected between the sense node and the control terminal of the first transistor; and
reference voltage circuitry connected to a control input of the second transistor to establish an overvoltage control point corresponding to the overvoltage condition;
the second transistor responsive to the input voltage signal at the sense node, and the overvoltage control point to control the first transistor to form the overvoltage current path in response to the overvoltage condition.

12. The system of claim 11 further comprising an input termination impedance matching resistor connected through the inductor to the input node.

13. The system of claim 11 further comprising third and fourth transistors connected respectively to the control terminal of the first transistor, and a control terminal of the second transistor, controllable to disable the shunt circuit.

* * * * *